United States Patent
Lucree

[19]

[11] Patent Number: 6,036,264
[45] Date of Patent: Mar. 14, 2000

[54] ANTI-BACTERIAL INFANT SEAT

[76] Inventor: Teresa Nan Lucree, 21953 Beverly Ave., Port Charlotte, Fla. 33952

[21] Appl. No.: 09/289,815

[22] Filed: Apr. 12, 1999

[51] Int. Cl.[7] .................................................. A47D 1/10
[52] U.S. Cl. ............................. 297/256.17; 297/219.12; 297/218.4; 297/228.11; 297/229
[58] Field of Search ...................... 297/256.17, 219.12, 297/226, 218.4, 228.4, 219.1, 218.3, 228.1, 228, 229; 280/33.992, 33.993; 150/157, 158

[56] References Cited

U.S. PATENT DOCUMENTS

| | | | |
|---|---|---|---|
| 2,483,223 | 9/1949 | Moss | 297/228.11 |
| 3,578,380 | 5/1971 | Jacobus | 297/229 X |
| 3,596,989 | 8/1971 | Van Ryn | 297/228.11 |
| 4,526,420 | 7/1985 | Kawamura et al. | 297/226 |
| 4,761,032 | 8/1988 | Sanchez et al. | 297/229 |
| 5,096,260 | 3/1992 | Hagerstrom | 297/256.17 |
| 5,238,293 | 8/1993 | Gibson | 297/229 X |

Primary Examiner—Anthony D. Barfield
Attorney, Agent, or Firm—Frank A. Lukasik

[57] ABSTRACT

A sanitary liner for a shopping cart infant seat consisting of a seat area shaped to fit within the shopping cart infant seat area, a flexible rim stitched to the top of the seat area and encircling the seat area, a narrow, flat, steel wire stitched to the bottom side of the rim and located between the outer edge and the seat area and encircling the seat area, a strap with a loop, chain, and hook stitched to the bottom of the seat area for fastening to the shopping cart, and a plurality of straps stitched to the flexible rim bottom side for securing the liner within the shopping cart infant seat.

4 Claims, 11 Drawing Sheets

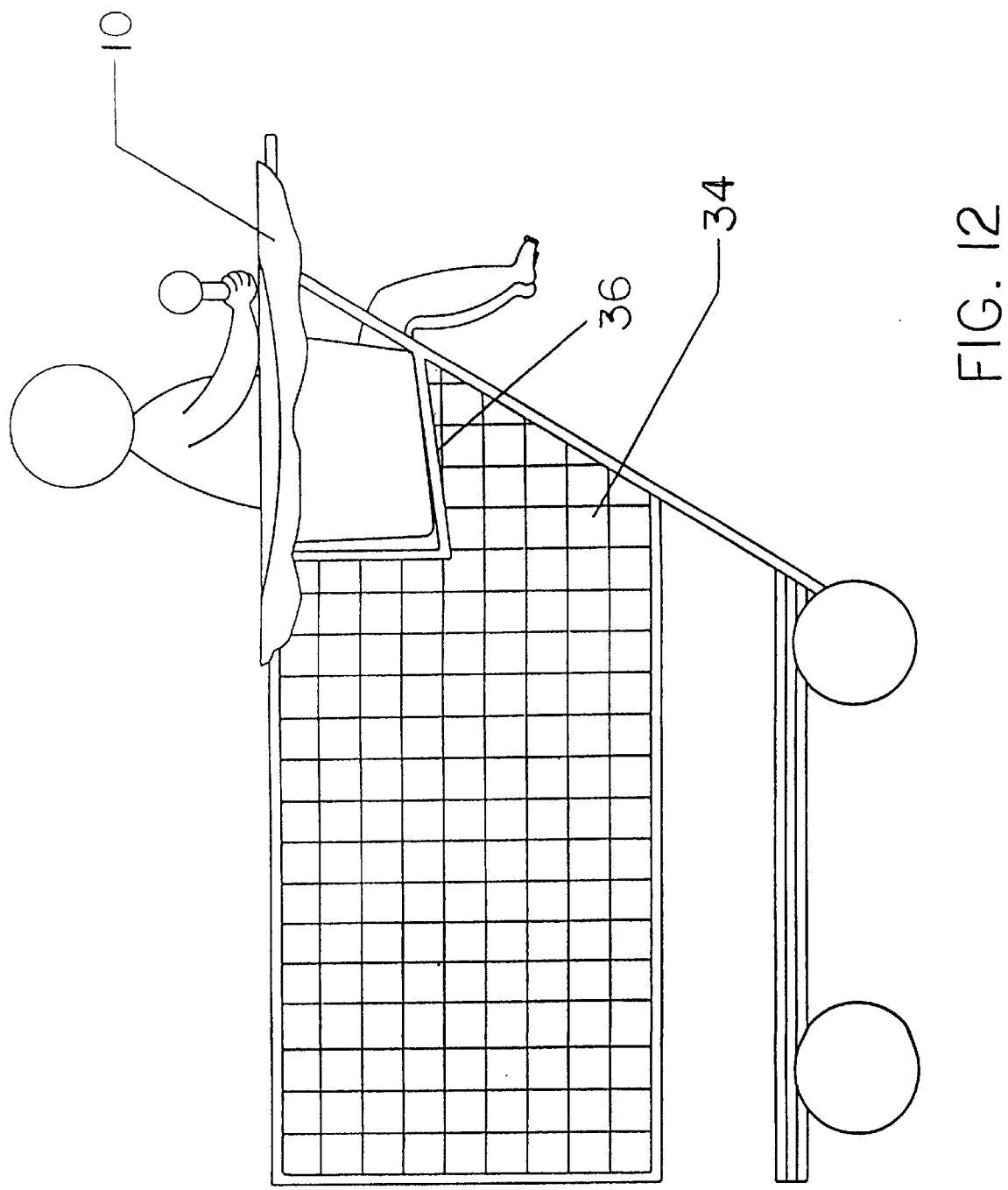

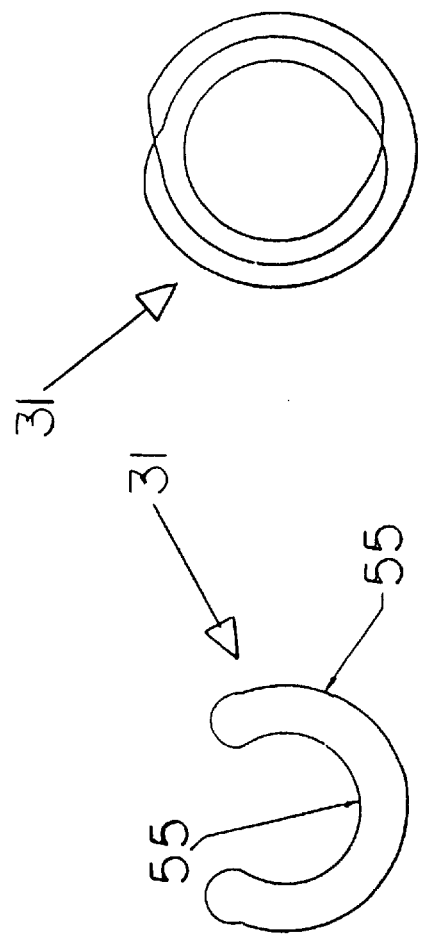
FIG. 15
FIG. 14
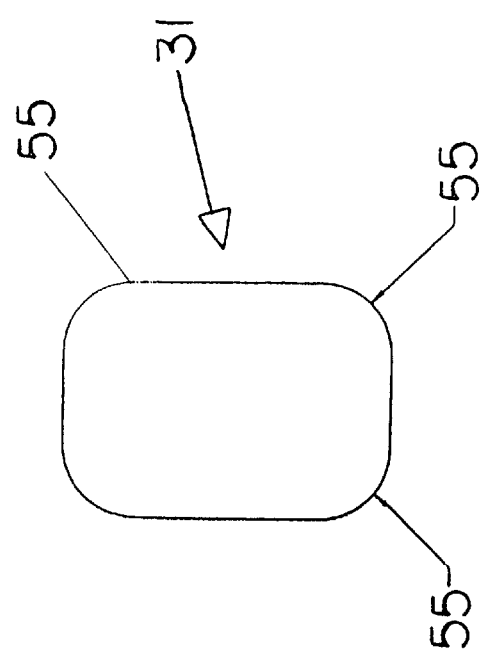
FIG. 13

ANTI-BACTERIAL INFANT SEAT

RELATED APPLICATION

This is related to U.S. Pat. No. 5,791,732, Issued Aug. 11, 1998.

BACKGROUND OF THE INVENTION

1. Field of the Invention

This invention relates generally to shopping carts and more specifically to an infant seat cover for shopping carts.

2. Discussion of the Prior Art

There are numerous products on the market for holding babies and infants in cars and other vehicles. Shopping carts are designed to provide a seat for the infant. The cart generally has a basket seat with two leg holes formed into the front, facing the push handle. A seat belt is usually provided to protect the infant from falling out of the cart seat. The seat usually has two flaps forming part of the seat when occupied and which can be rotated upwardly to block the leg holes when an infant is not present and the shopper wishes to store articles in the seat portion.

Infant seats similar to the type used in automobiles are sometimes provided by the store or brought in by the infant's parent and inserted in the area formed by the infant seat of the cart. The store seat is placed in the area formed in the cart for the infant and fastened in place. If the seat is provided by the store, it has been used repeatedly by many infants and usually carries bacteria left by previous occupants. The seat carried by the child's parent is bulky and may not fit in the cart space. In addition, carrying the seat into the store is an additional burden.

Currently, a child is placed in the shopping cart seat, strapped in, and the parent begins to shop. An observer can readily notice that babies tend to place everything in their mouths, including the parts of the cart, namely the front and side rails. Furthermore, infants occasionally have an accident and mess their diapers, and very often, the shopping cart. In addition to spreading any bacteria that is present in the diaper, additional bacteria is spread from one child to the other by merely touching the cart and then placing their hands in their mouths.

SUMMARY OF THE INVENTION

The present invention provides a more convenient means for providing a sanitary liner for a shopping cart infant seat. The invention is made of a fabric, such as nylon, cotton, waterproof material, or other suitable material. The nylon fabric seat that is mounted on a wire frame, enables the owner to fold the seat cover with a simple twist (similar to the windshield shades). In its closed position it fits into a flat 12" square bag. When removed from the bag, the seat cover pops open for instant use. It covers the seating area of large and small shopping carts and overlaps the top edges and handle of the shopping cart. The front (according to the direction of the seated) may be fastened with hook and loop fasteners, or other items such as hooks, snaps, etc., around the handle of the chopping cart to discourage the infant from pulling the fabric back and exposing themselves to whatever contaminants might be on the shopping cart.

The bottom back of the seat cover has two hooks that fasten to the bottom back horizontal bar of the shopping cart seat. There is a seat belt on the inside of the seat cover positioned opposite the hooks. This fastens the infant more securely than the shopping cart seat belt which typically fastens around their waist or chest. The seat belt in the seat cover fastens around the area of the infant's body where their legs and hips join, holding them back and down, making it difficult, if impossible for the infant to climb out. In each case (and there have been many), where an infant has fallen out of a shopping cart, they have been fastened into the shopping cart's seat belt, which is always too high and often too wide to stop an infant from standing up in the seat.

The leg holes of the seat cover, in accordance with the invention, are shaped like an upside down "T". The leg holes have been particularly sized to fit closely around the infant's legs, thereby preventing their toys, bottle, pacifier, cookies, etc., from falling on the floor. The stitches can be cut to make the leg hole openings larger as the infant grows.

At the base of the leg holes, a rod is suspended by sliding the rod at an angle through the leg hole opening of the shopping cart. When the rods are suspended in a horizontal position, they keep the bottom of the seat cover form sliding back and exposing the bottom seat area of the shopping cart.

Hook and loop (VELCRO) straps, or other fasteners are attached to the underside of the rim for fastening to the cart frame to retain the liner within the seat area.

In a preferred embodiment, the rim is held extended by a narrow, flat, steel wire to provide stability and ease of application for use and easy storage. In a second embodiment, the flat steel wire is not used. To fold for storage, two corners nearest the user are grasped and folded towards each other to form a product that is reduced by two thirds in area when folded for carrying and storing. The folded liner is thus reduced to less than one third the size of the opened liner. The liner may be laundered as any other fabric to provide a continuous anti-bacterial environment for the child. A short length of chain is fastened to the underside of the liner, near the hooks, for attachment to the shopping cart to prevent accidental removal of the liner from the cart. The chains are provided to fasten the seat cover to the legs of a high chair (or the occasional shopping cart that has an obstruction blocking the bottom horizontal bar of the seat).

The seat cover may also be used in other places such as public park swings or strollers, either rental or one's own stroller to maintain a clean seat during feedings. The storage bag can be made with additional padding on one side to provide the infant with a pillow. A carrying strap may also be attached to the storage bag for carrying purposes.

BRIEF DESCRIPTION OF THE DRAWINGS

FIG. 12 is a side view of a shopping cart with an infant seat in accordance with the invention.

FIG. 13 is a top view of the steel wire in the first step of folding in accordance with the invention.

FIG. 14 is a top view of the steel wire in the second step of folding in accordance with the invention.

FIG. 15 is a top view of the steel wire in a folded position in a accordance with the invention.

DESCRIPTION OF THE PREFERRED EMBODIMENT

Figure 1:
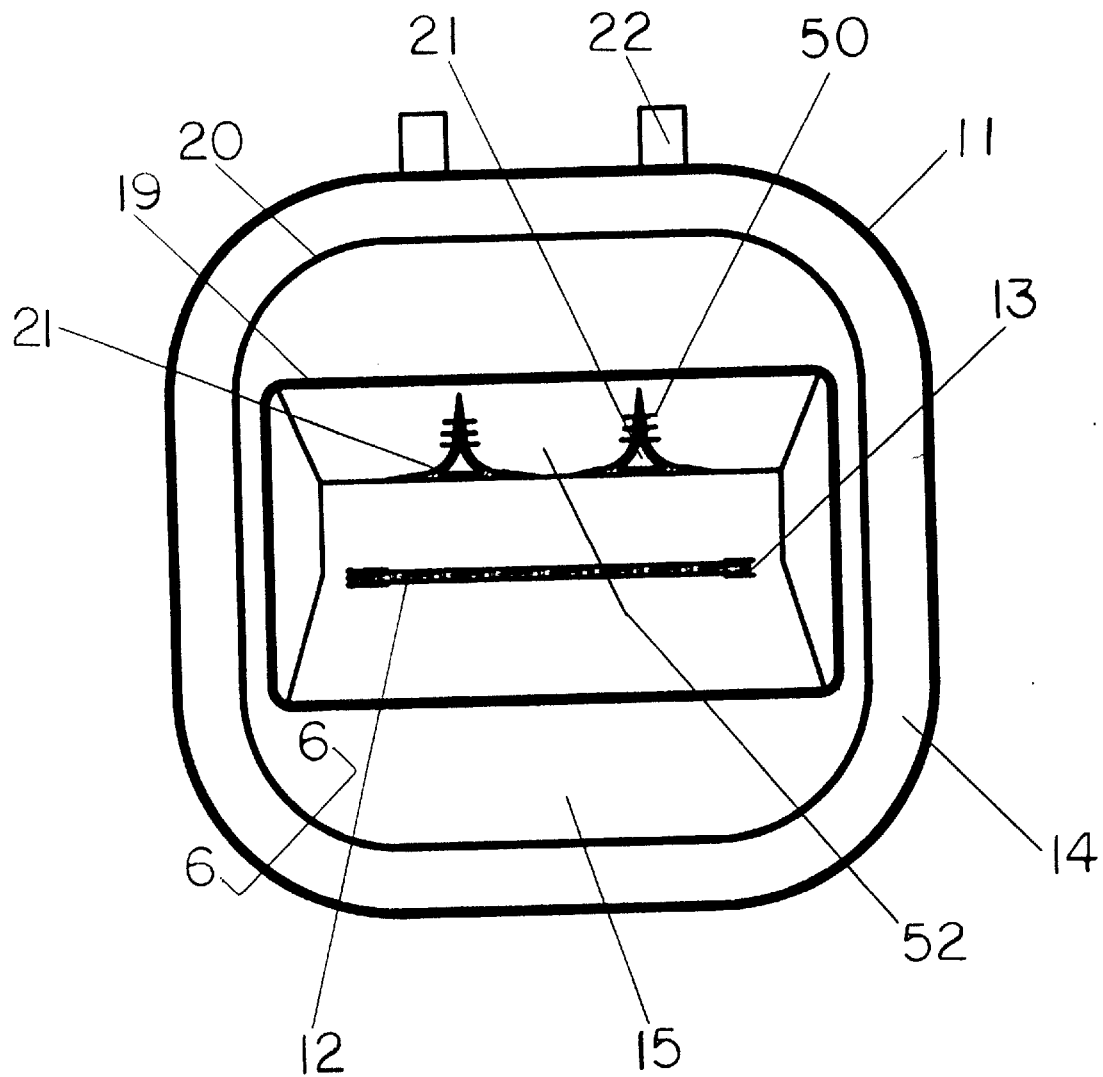
FIG. 1 is a top view of the infant seat cover in accordance with the invention.

The infant seat of the invention is indicated generally by the numeral 10 in the top view shown in FIG. 1. The infant seat 10 may be made from any fabric, including nylon, cotton, or other suitable material. A water repellent or water proof material would be preferred.

Figure 11:
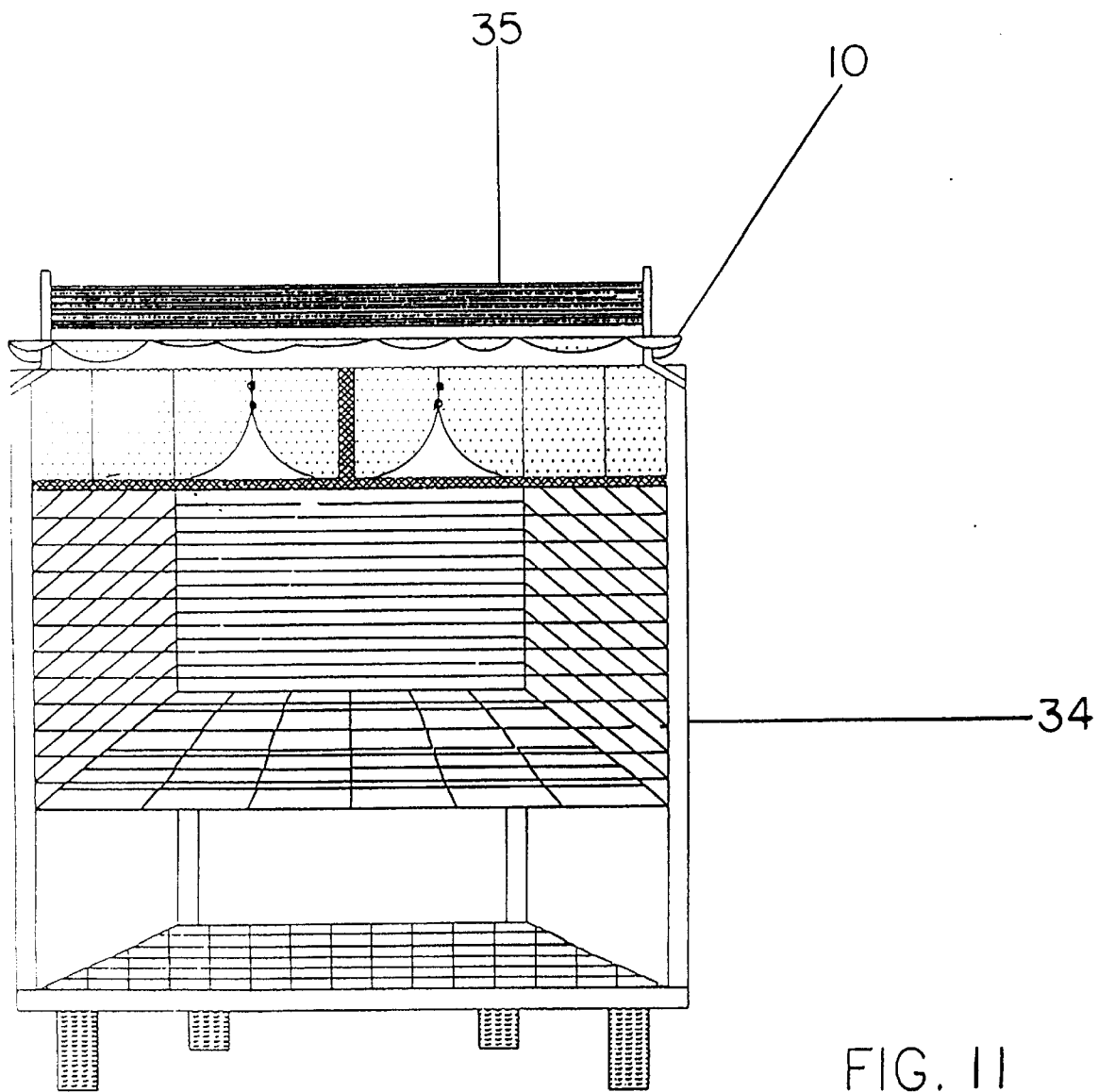
FIG. 11 is a frontal view of a shopping cart with an infant seat cover.

FIGS. 11 and 12 also show the relationship between the infant seat 10, installed in a shopping cart 34, with an infant seated in the seat.

Figure 16:
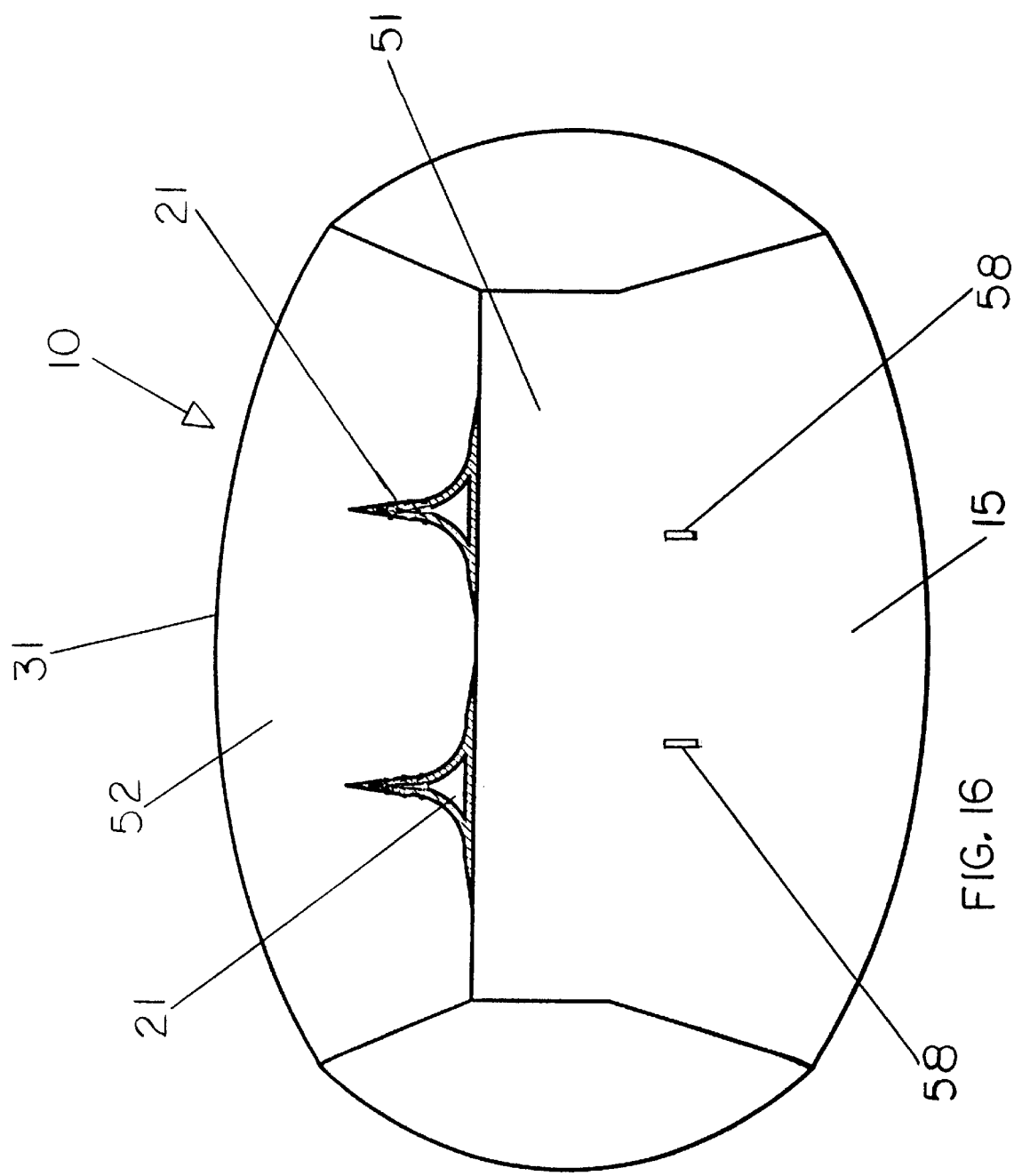
FIG. 16 is a top view of a second embodiment of the infant seat cover for shopping carts in accordance with the invention.

FIG. 1 is a top view of the infant seat 10 in an extended position. The outer edge 11 is cut and covered with trim 28, fastened with stitching 32 to form a rectangular shape, or oval shape (FIG. 16), with rounded corners and sufficiently large to cover the shopping cart infant seat 36 and the surrounding structure of the infant seat 36. In most cases, the outer edge 11 will cover the handle 35 of the shopping cart 34 as well. The seat cover portion consists of a single fabric panel forming the bottom panel 51 and the back panel 15. Two side panels 39, when sewn together with the bottom panel 51 and back panel 15, are used to cover the inside of infant seat 10. Front panel 52 completes the enclosure forming the seat 10. Outer trim 41 is stitched around the seam where the front panel 52, the bottom panel 51, and the back panel 15 are joined at the edge.

The adjustable leg openings 21 are cut in the front panel 52 and are trimmed with stitching around the open space created by the leg openings 21 cuts. The leg openings 21 are in the form of a slit to provide access for the infant's legs. The leg openings 21 are held in a partially closed position by stitching 50 or could be held by another method such as snaps, lacing, etc. As the child grows, the stitching 50 may be removed one at a time to open the space as the child grows. The smaller opening 21 will keep the infant's toys or whatever is given the infant to entertain them, from falling out of the leg openings 21 on to the floor.

The leg openings 21 are shown stitched in a partially closed position by stitching 50 to indicate the smallest leg opening which would be required for a very small infant. These stitches 50 could also be applied to the slit area on the sides of the infant's legs. As the infant grows and the legs become larger, a second stitch 50 may be removed. The original leg openings 21 have been sized to fit the smallest to the largest infant to be carried in the baby seat 10.

The assembled and stitched seat cover portion 53 is then attached to the flexible flap 14 by covering the stitching with a bias tape, inner trim 19, and then sewing them together. The seat cover portion 53 is three dimensional and formed to conform to the shape of the cart infant seat 36. The outer edge flexible flap 14 is sufficiently large to cover all parts of the shopping cart 34 which would be within the reach of the infant.

Figure 6:
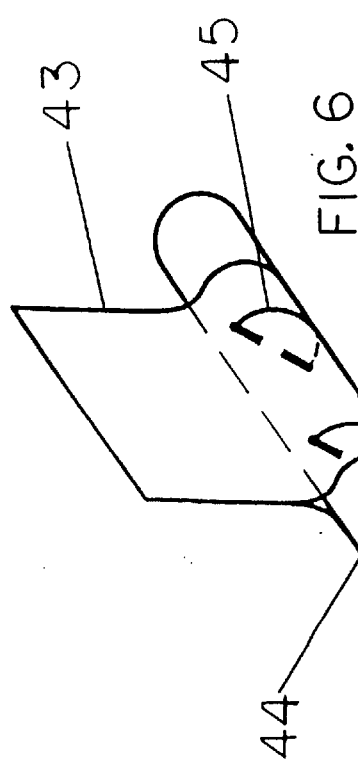
FIG. 6 is a perspective view of the leg lock in accordance with the invention.

FIG. 6 is a sectional view of the outer edge trim 11. Also shown is the bias tape cover 30 wrapped around the steel wire 31 and stitched 29 to the flexible flap 14 at approximately 2½" from the outer edge trim 11.

Figure 1A:
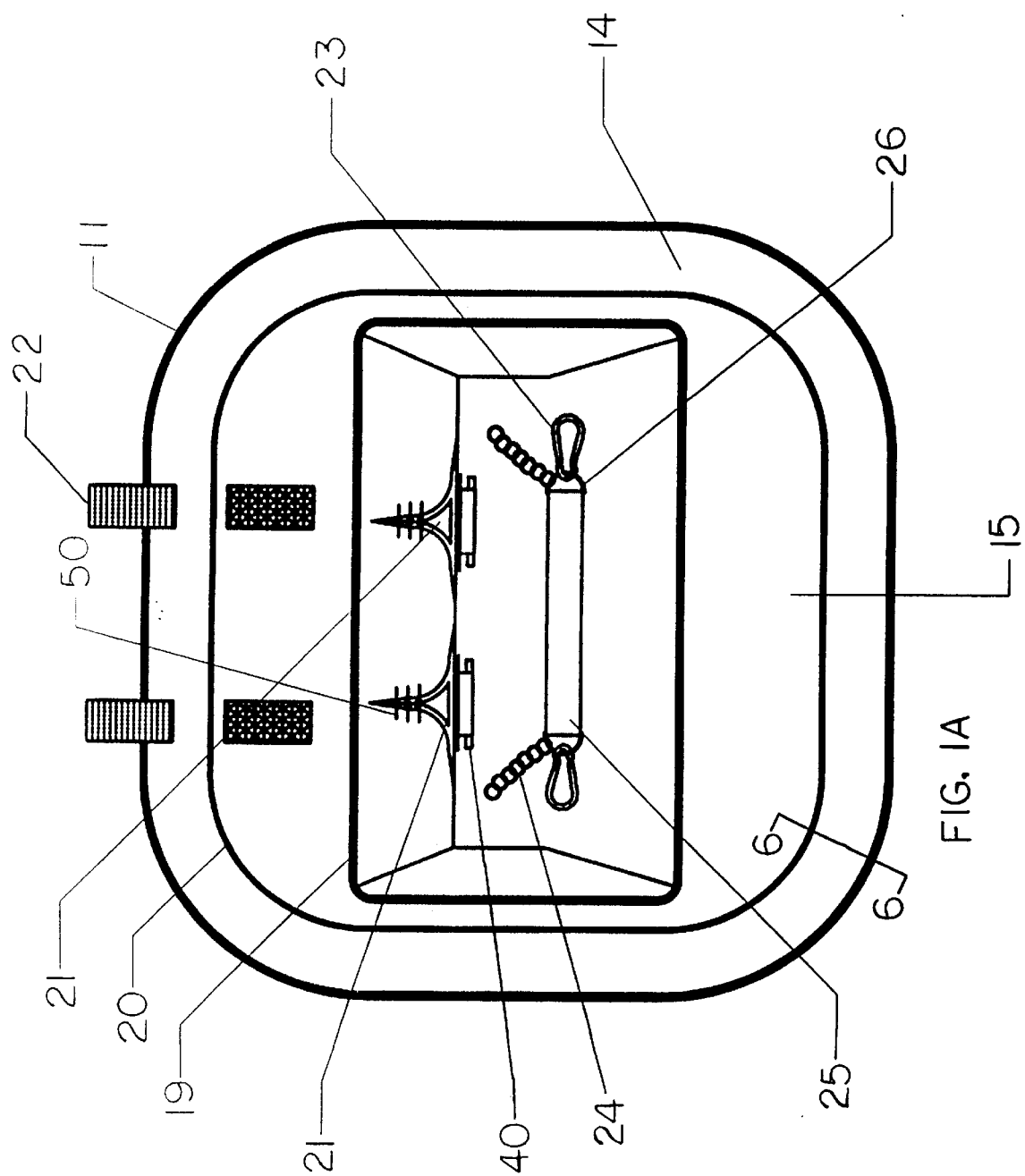
FIG. 1A is a bottom view of the infant seat cover in accordance with the invention.
Figure 2:
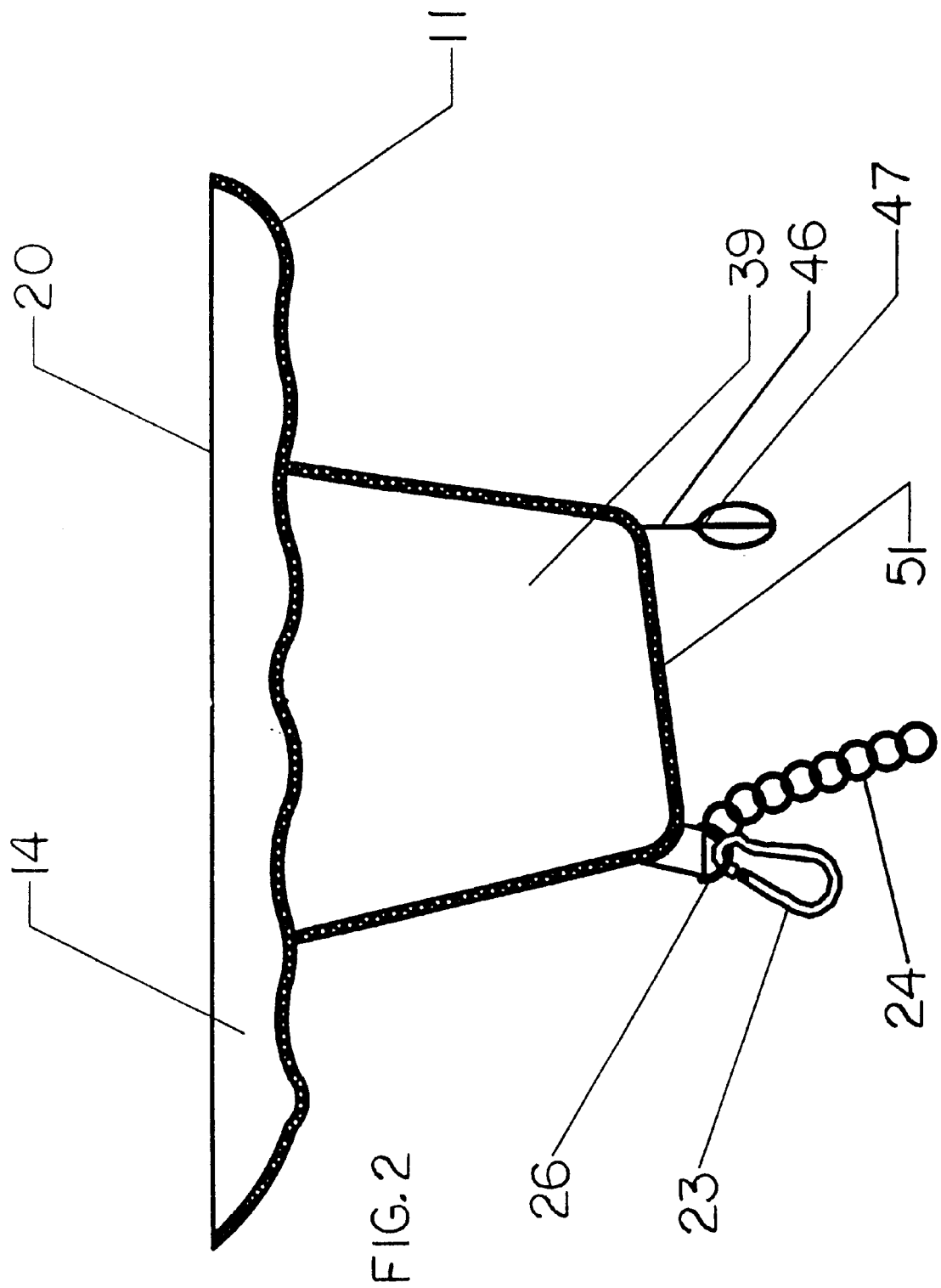
FIG. 2 is a side view of the infant seat cover in accordance with the invention.
Figure 3:
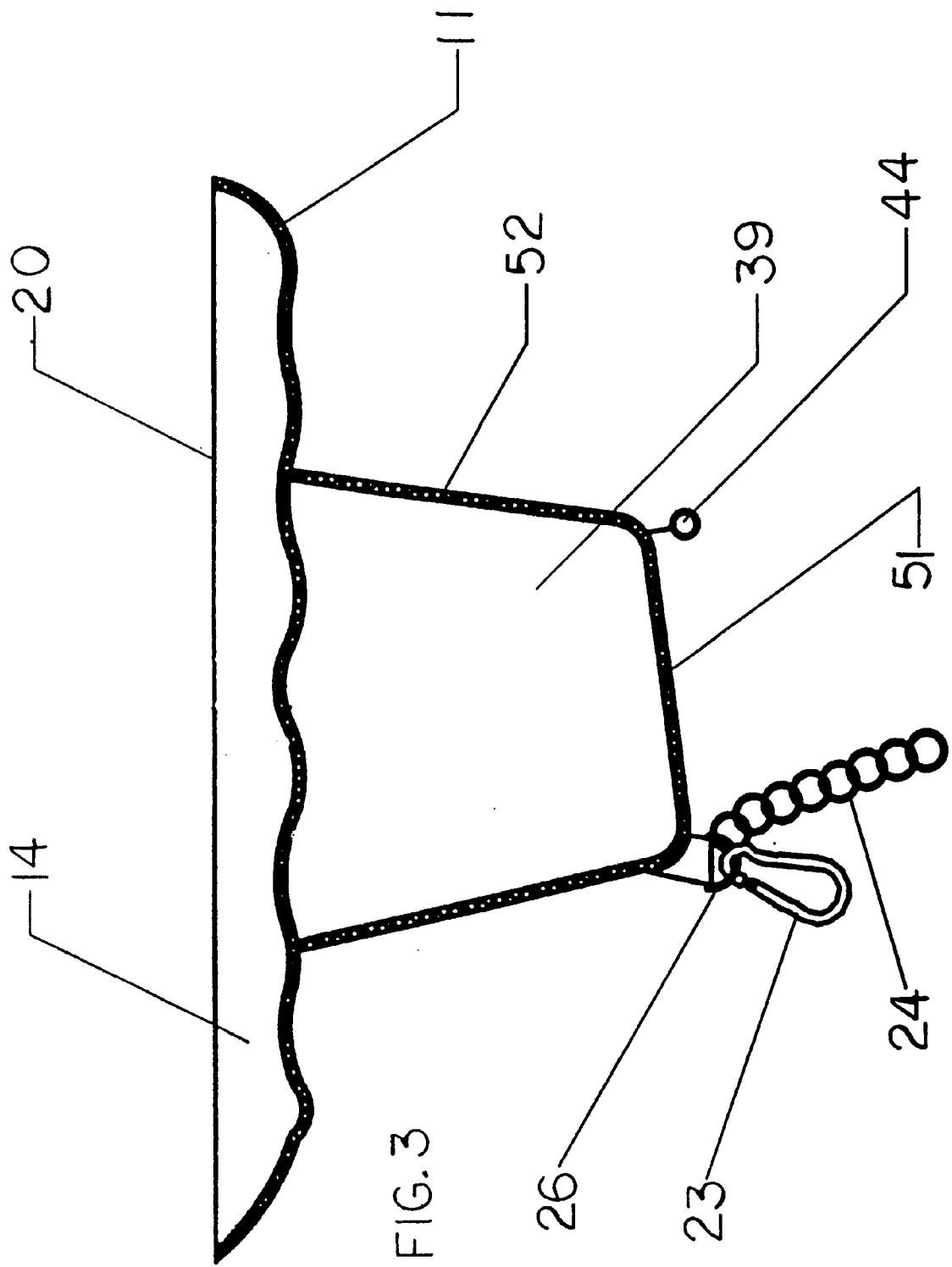
FIG. 3 is a side view of a second embodiment of the infant seat cover in accordance with the invention.
Figure 4:
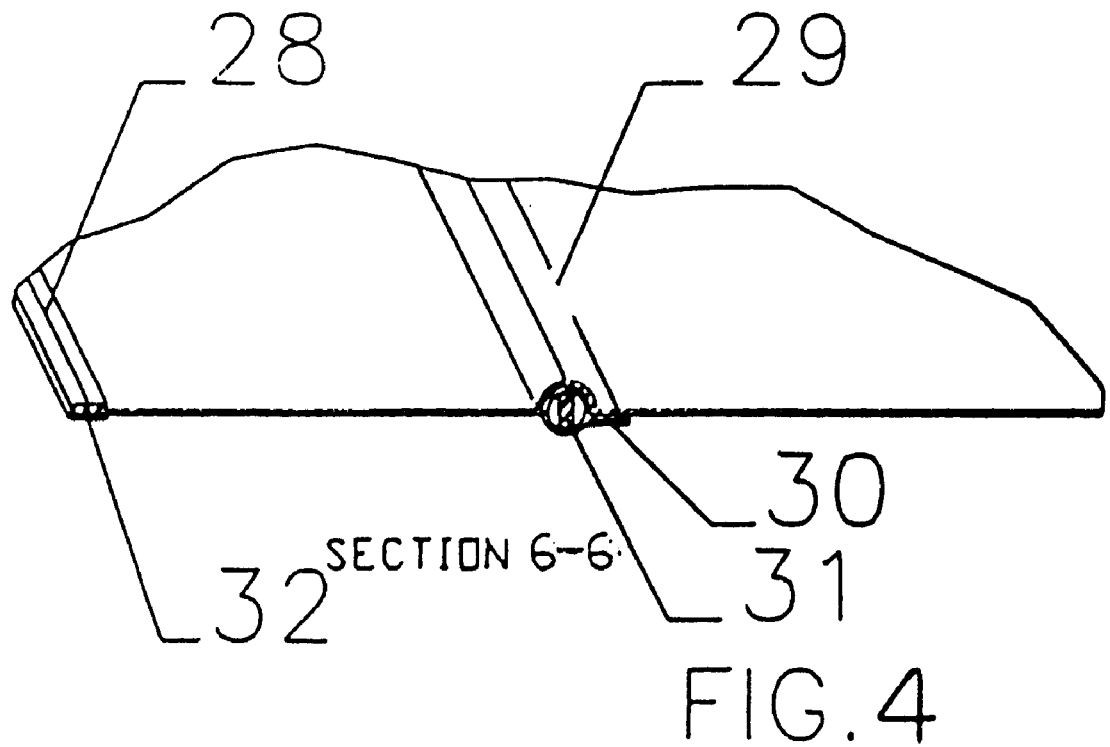
FIG. 4 is a sectional view of the wire assembly in accordance with the invention.
Figure 18:
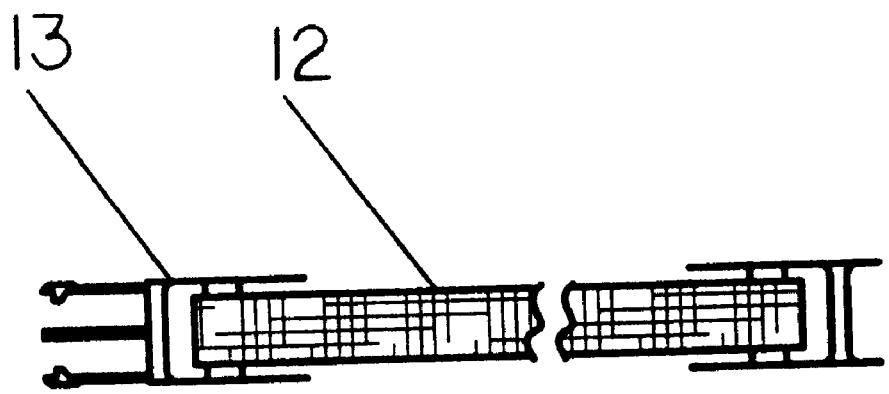
FIG. 18 is a top view of the seat belt in accordance with the invention.

FIG. 1A is a bottom view of the baby seat 10 showing the locations of the hook and loop straps 22 on the baby seat 10. Each of the straps 22 are fastened to the flexible flap 14 by stitching to the flexible flap 14 at the point where the bias tape 30 fastens the steel wire 31 to the flexible flap 14. This fastens the anti-bacterial seat cover 10 around the handle of the shopping cart 34 so the child cannot expose themselves to the cart 34. Other items, such as ties, hooks, snaps etc. could also be used.

The seat cover 10 is fastened to the shopping cart seat 36 by attaching the hooks 23 to the cart 34 or by wrapping chain 24 around the wires of the shopping cart seat 36 and fastening with hooks 23 which are attached to loops 26 and strap 25 which is stitched to the bottom 51 of the seat cover 10. When the seat cover 10 is used in other seating areas, especially highchairs, the chains 24 and hooks 23 will almost always be needed to safely secure the seat and thus the infant with the seat belt 12.

Figure 8:
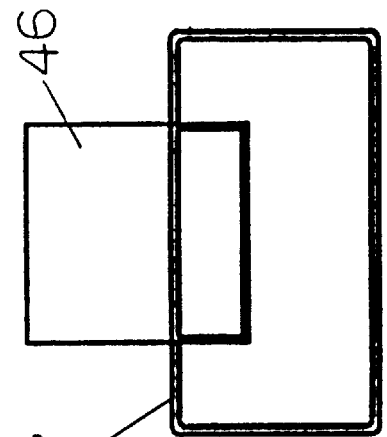
FIG. 8 is a frontal view of a second embodiment of the leg lock in accordance with the invention.
Figure 9:
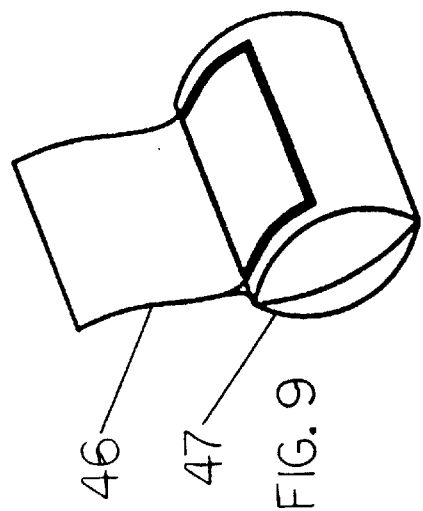
FIG. 9 is a perspective view of a second embodiment of the leg lock in accordance with the invention.
Figure 10:
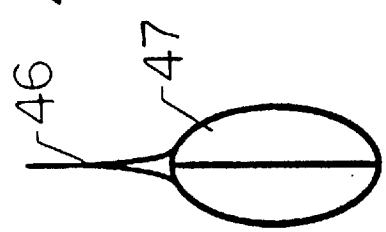
FIG. 10 is a side view of a second embodiment of the leg lock in accordance with the invention.
Figure 5:
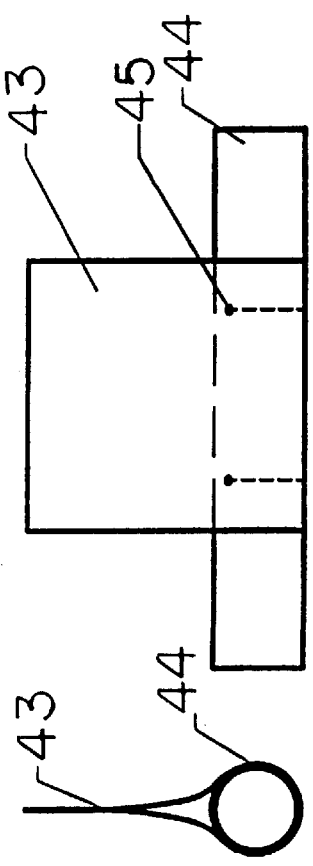
FIG. 5 is a frontal view of the leg lock in accordance with the invention.
Figure 7:
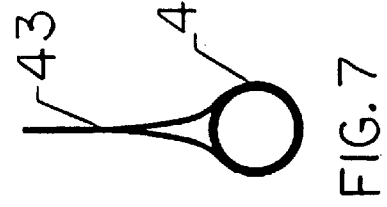
FIG. 7 is a side view of the leg lock in accordance with the invention.

Leg locks 40 are stitched to the bottom edge of leg openings 21. FIGS. 5–10 show two embodiments of leg locks 40. FIGS. 5–7 show a fabric panel 43 which is looped around a tube 44 and secured to the tube 44 by stitching 45 running through the fabric panel 43 and tube 44. FIGS. 8–10 show a second embodiment with a fabric panel 46 attached to a pouch 47 filled with sand or other granular material. Other devices could also be used to accomplish the same purpose. For example, the leg locks 14 could be attached by hooks, tied, snapped, hook and loop, etc.

Figure 17:
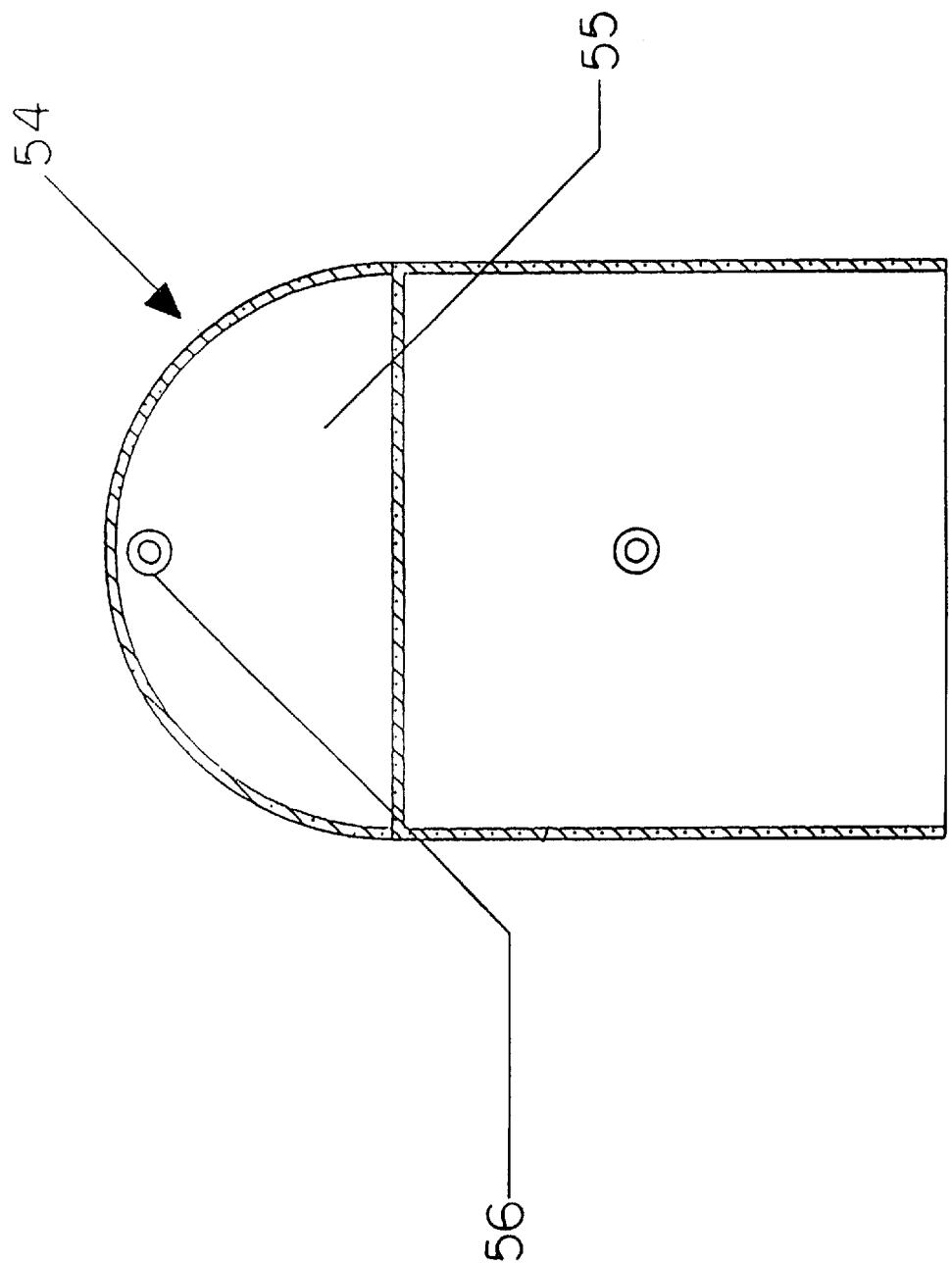
FIG. 17 is a top view of a pouch for carrying the folded cove in accordance with the invention.

FIG. 17 shows an accessory pocket 54 having a cover 55 and a two part snap fastener 56 for securing the cover 23 in a closed position. The pocket 54 is sized to hold the seat cover 10 when it is folded as shown in FIGS. 13–15.

In actual use of the infant seat cover 10 of the invention, the adult places the infant seat cover 10 over the area of the infant seat 36 and the surrounding stainless steel wires including the handle 35 if appropriate. The straps 22 are then wrapped around the wire frame of the shopping cart 34 and mated. Pulling the straps 22 tightly will assure that all of the structure within reach of the infant will be covered by the infant seat cover 10.

Referring to FIGS. 13–15, the steps for folding the infant seat 10 are shown. The wire 31 is gripped with one hand at each of the locations shown by the arrows 55. The section of the wire 31 furthest from the operator, is pulled in as shown in FIG. 14. The wire 31 will automatically mold into the shape shown in FIG. 15. From this point, the infant seat 10 can easily slip into the pocket 54 for easy, compact handling. The infant seat cover 10 can also be made in a variety of sizes for use in high chairs, strollers, baby swings, etc.

While the invention has been explained with respect to a preferred embodiment thereof, it is contemplated that various changes may be made in the invention without departing from the spirit and scope thereof.

What is claimed is:

1. A sanitary liner for a shopping cart infant seat comprising:

a seat area adapted to fit within a space of the infant seat, said seat having a top end, a front, a back, and two sides, said front having two adjustable size leg openings formed therein, a leg lock stitched to the bottom of each of said leg openings, a flexible rim stitched to said top end of said seat area, and enclosing said seat area, said rim having a top side and a bottom side, and an outer edge, a continuous loop formed by a narrow, flat, steel wire stitched to said bottom side of said rim, said steel wire located between said outer edge and said seat area and encircling said seat area, a strap stitched to said seat area back, said strap having a loop, chain and hook fastened at each of said ends for fastening said seat liner to said shopping cart, a seat belt stitched to said seat in an area directly above said strap, and a plurality of straps stitched to said flexible rim bottom side for securing the seat liner within the shopping cart infant seat.

2. The sanitary liner for a shopping cart infant seat of claim 1 wherein said straps consist of hook and loop straps stitched to said flexible rim bottom side.

3. The sanitary liner for a shopping cart infant seat of claim 1 wherein said flat steel wire is, wrapped with a bias tape and stitched to said flexible rim at a distance in a range between two inches and three inches.

4. A sanitary liner for a shopping cart infant seat comprising:

a seat area adapted to fit within a space of the infant seat, said seat area having a top end, a front, a back, and two sides, said front having two adjustable size leg openings formed therein, a leg lock stitched to the bottom of each of said leg openings, a flexible rim stitched to said top end of said seat area, said rim having a top side and a bottom side, and an outer edge, a continuous loop formed by a narrow, flat, steel wire wrapped with a bias tape and stitched to said flexible rim encircling said seat area, a strap stitched to said seat back, said strap having two opposite ends, and having a loop, chain and hook fastened at each end of said ends for fastening said seat liner to said shopping cart, a seat belt attached to said seat in an area directly above said strap and a plurality of hook and loop straps stitched to said flexible rim bottom side for securing the seat liner within the shopping cart infant seat.

* * * * *